(No Model.)
C. KERNER, Jr.
PEDAL FOR BICYCLES.
No. 598,788. Patented Feb. 8, 1898.
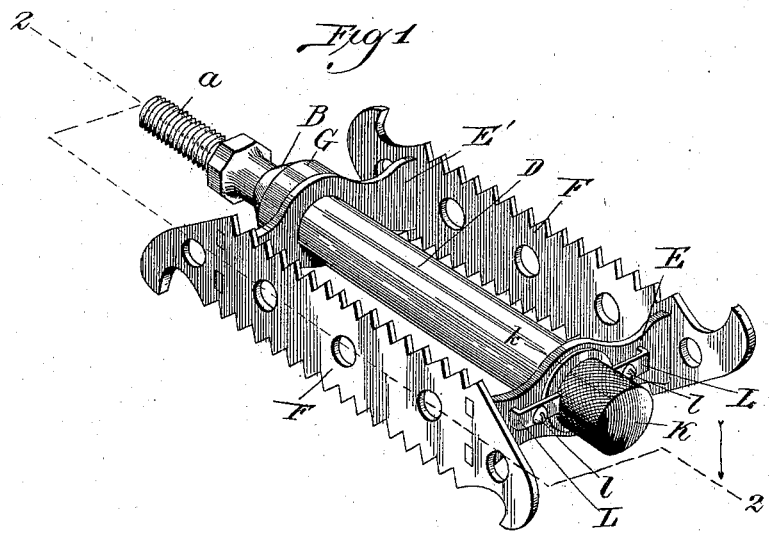
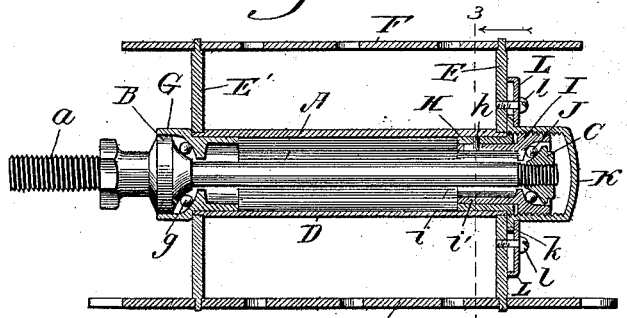
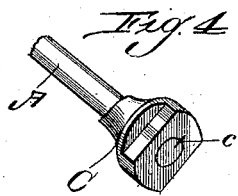
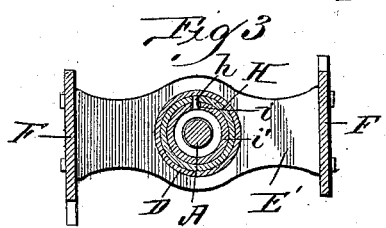
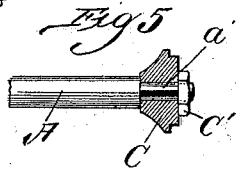
Witnesses
John L. Timison
J. Cross
Inventor:
Charles Kerner Jr.
By his attorneys
Gurley & Hopkins

UNITED STATES PATENT OFFICE.

CHARLES KERNER, JR., OF CHICAGO, ILLINOIS.

PEDAL FOR BICYCLES.

SPECIFICATION forming part of Letters Patent No. 598,788, dated February 8, 1898.

Application filed October 10, 1896. Serial No. 608,485. (No model.)

*To all whom it may concern:*

Be it known that I, CHARLES KERNER, Jr., a citizen of the United States, residing at Chicago, in the county of Cook and State of Illinois, have invented certain new and useful Improvements in Pedals for Bicycles and other Velocipedes, of which the following is a specification, reference being had to the accompanying drawings, which are made a part thereof, and in which—

Figure 1 is a perspective view of a pedal embodying the invention. Fig. 2 is a longitudinal section thereof in the plane indicated by the line 2 2, Fig. 1. Fig. 3 is a transverse section thereof in the plane indicated by the line 3 3, Fig. 2. Figs. 4 and 5 are respectively a perspective view and a sectional elevation of the outer end of the pedal-pin and the outer cone carried thereby.

The present invention relates to the means for adjusting the bearing-rings of the pedal; and it consists in the features of novelty that are particularly pointed out in the claims hereinafter.

In the drawings, A represents the pedal-pin, which may be threaded at $a$ in order to effect its attachment to the crank. It is provided with two cones B and C, the former of which is preferably integral with it and the latter of which is preferably formed separately and attached to it, the nature of the attachment being such that when in use the cone and pedal are incapable of rotating relatively to each other, and hence operate as a single member. I do not limit myself to any particular manner of accomplishing this non-rotating attachment of the cone and pedal-pin, but I prefer to use means which will enable the cone to be removed from the pedal-pin when it is desired to do so. In Figs. 2 and 4 of the drawings I have shown them as having threaded engagement, and in Fig. 4 I have shown at $c$ an indentation or notch caused by a blow of a tool by which their engaging threads have been slightly mashed together or distorted, whereby the relative rotation of the two parts is resisted by a force which is amply sufficient as against any force which will be exerted upon the cone during the ordinary use of the pedal and which at the same time will not prevent the cone from being removed by the application of a wrench.

In Fig. 5 I have shown the pedal-pin as being provided at $a'$ with a non-circular portion, which occupies an eye of corresponding shape in the cone, so that they are absolutely and positively incapable of any relative rotation, the cone being secured in place by a check-nut $C'$.

D is the shell or barrel, which is preferably constructed of a piece of cylindrical tubing, to which are secured the cross-heads E E', which support at their outer ends the treads F. Within one end of the shell is permanently secured a cup G, between which and the cone B are arranged antifriction-balls $g$. Within the outer end of the shell is permanently secured a short sleeve or ring H, and to this ring or sleeve is permanently secured a pin $h$, which projects inward and occupies a slot $i$, disposed longitudinally in a hollow extension $i'$ of the outer cup I, between which and the cone C are arranged antifriction-balls J. The ring or sleeve H may, if desired, be brazed, but ordinarily it will be held with sufficient firmness if it is simply pressed to place, proper regard being had to the relative diameters of the exterior of the sleeve and the interior of the shell D. Its sole object is to provide a simple and efficient means for supporting the pin $h$, by which the cup I is held against rotation and at the same time permitted to move endwise relatively to the shell D. While I prefer to use this means for accomplishing these results, still I desire to have it understood that the invention is not limited thereto, but, on the contrary, comprehends any means by which the cup I and shell D are held against relative rotation and at the same time allowed relative endwise movement, the term "endwise" as herein used meaning in the direction of the length or axis of the shell. The cup I has threaded engagement with a part K, which is capable of rotating, but incapable of moving endwise relatively to the shell, so that when it is rotated it will cause the cup I to move endwise, either inward or outward, according to the direction of rotation. Preferably this part K takes the form of a cap which completely covers and protects the cup I and all of its associated parts and is provided with a marginal flange $k$, which rests upon the cross-head E and is engaged by a keeper (or keepers) L. This keeper consists of an L-shaped piece of metal the shorter arm of which bears upon the cross-head E, while the longer arm bears upon the flange $k$, and it is perforated for the passage of a screw $l$, which has threaded engagement with the cross-head E. By tightening the screw $l$ the keeper may be made to clamp the flange $k$ of the cap with sufficient force to prevent the cap from being rotated relatively to the shell. By slightly loosening the screw the cap is released, so that it may be rotated and at the same time held against endwise movement relatively to the shell, and by removing the screw the keeper may be removed in order to permit of the removal of the cap.

It will be seen that in a pedal thus constructed the friction incident to rotation cannot by any possibility alter or change the adjustment of the bearing. This is due to the fact that the adjustable bearing-ring (the cup I in the illustration given) is positively held against any rotation relatively to the part by which it is carried, its adjustment being accomplished by the rotation of the part with which it has threaded engagement and which is capable of only an endwise movement relatively to the part by which the adjustable bearing-ring is carried.

Having thus described my invention, the following is what I claim as new therein and desire to secure by Letters Patent:

1. In a pedal, the combination with a pedal-pin and a bearing-ring carried thereby, of a shell surrounding and revoluble about the pedal-pin, an adjustable bearing-ring carried by the shell, means for preventing the relative rotary and permitting the relative endwise movement of the adjustable bearing-ring and shell, a part carried by the shell, means for preventing the relative endwise and permitting the relative rotary movement of said part and shell, and means whereby the rotary movement of said part causes the adjustable bearing-ring to be moved endwise, substantially as set forth.

2. In a pedal, the combination with a pedal-pin and a bearing-ring carried thereby, of a shell surrounding and revoluble about the pedal-pin, an adjustable bearing-ring carried by the shell, means for preventing the relative rotary and permitting the relative endwise movement of said adjustable bearing-ring and shell, a revoluble cap, and means whereby the rotary movement of the cap causes the relative endwise movement of the adjustable bearing-ring and shell, the cap being so disposed that it covers the adjustable bearing-ring and its associated parts, substantially as set forth.

3. In a pedal, the combination with a pedal-pin and a bearing-ring carried thereby, of a shell surrounding and revoluble about the pedal-pin, an adjustable bearing-ring carried by the shell, means for preventing the relative rotary and permitting the relative endwise movement of said adjustable bearing-ring and shell, a cap carried by the shell, means for preventing the relative endwise and permitting the relative rotary movement of the cap and shell, and means whereby the rotary movement of the cap causes the relative endwise movement of the adjustable bearing-ring and shell, the adjustable bearing-ring and its associated parts being covered by the cap, substantially as set forth.

4. In a pedal, the combination with a shell and an adjustable bearing-ring, of means for preventing the relative rotary and permitting the relative endwise movement of said shell and bearing-ring, a cap having threaded engagement with the bearing-ring and having an annular flange, and means engaging said flange and preventing the relative endwise and permitting the relative rotary movement of said cap and shell, substantially as set forth.

5. In a pedal, the combination with a suitable shell, of a bearing-ring having an extension projecting into the shell, means for preventing the relative rotary and permitting the relative endwise movement of the bearing-ring and shell, a part having threaded engagement with the bearing-ring, a cross-head supported by the shell, and means securing the threaded part aforesaid to the cross-head and preventing the relative endwise and permitting the relative rotary movement of said part and shell, substantially as set forth.

6. In a pedal, the combination of a shell, an adjustable bearing-ring having an extension projecting into the shell, a part having threaded engagement with the bearing-ring, said part being in the nature of a cap which incloses the bearing-ring and associated parts and being provided with an annular flange, a cross-head carried by the shell, and means secured to the cross-head and engaging the flange of the cap whereby it is held against endwise movement relatively to the shell, substantially as set forth.

7. In a pedal, the combination of a shell, a part closing the outer end of the shell, means for preventing the relative endwise and permitting the relative rotary movement of said part and shell, an adjustable bearing-ring having threaded engagement with said part, and means for preventing the relative rotary and permitting the relative endwise movement of said bearing-ring and shell, substantially as set forth.

CHARLES KERNER, JR.

Witnesses:
L. M. HOPKINS,
I. CROSS.